(No Model.)　　　　　　　　　　　　　　　3 Sheets—Sheet 1.
W. M. JEWELL.
APPARATUS FOR CLEANSING FILTERS.

No. 577,755.　　　　　　　　　Patented Feb. 23, 1897.

Witnesses:　　　　　　　　　　　　　　Inventor
H. B. Hallock　　　　　　　　　　　　William M. Jewell
John L. Jackson.　　　　　　　　　　By Boudinot & Pickard
　　　　　　　　　　　　　　　　　　　　Attorneys

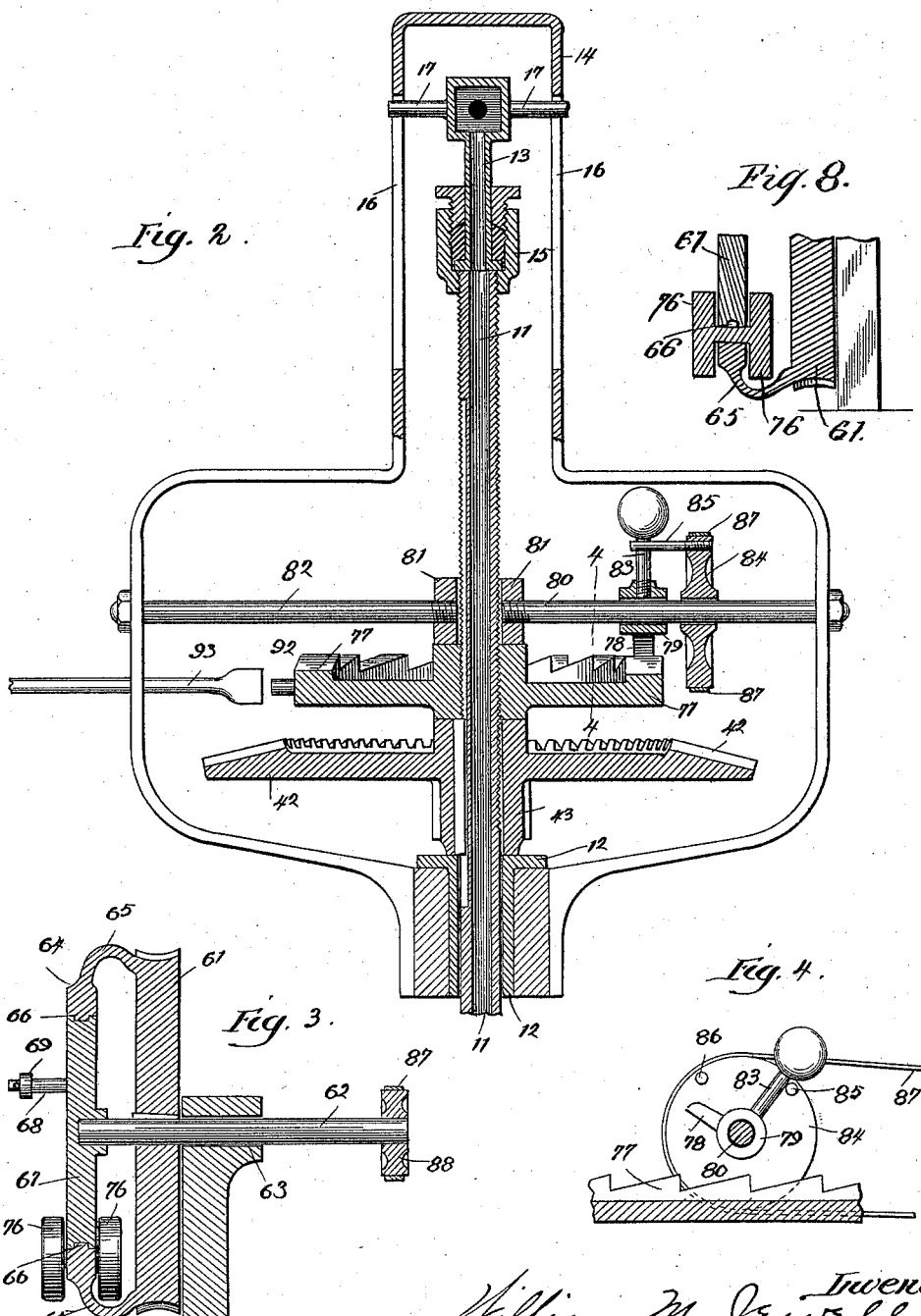

(No Model.) 3 Sheets—Sheet 3.

W. M. JEWELL.
APPARATUS FOR CLEANSING FILTERS.

No. 577,755. Patented Feb. 23, 1897.

UNITED STATES PATENT OFFICE.

WILLIAM M. JEWELL, OF CHICAGO, ILLINOIS, ASSIGNOR OF ONE-HALF TO OMAR H. JEWELL, OF SAME PLACE.

APPARATUS FOR CLEANSING FILTERS.

SPECIFICATION forming part of Letters Patent No. 577,755, dated February 23, 1897.

Application filed April 7, 1892. Serial No. 428,226. (No model.)

*To all whom it may concern:*

Be it known that I, WILLIAM M. JEWELL, a citizen of the United States, residing at Chicago, in the county of Cook and State of Illinois, have invented a certain new and Improved Apparatus for Cleansing Filters, of which the following is a specification, reference being had to the accompanying drawings, in which—

Figure 1:
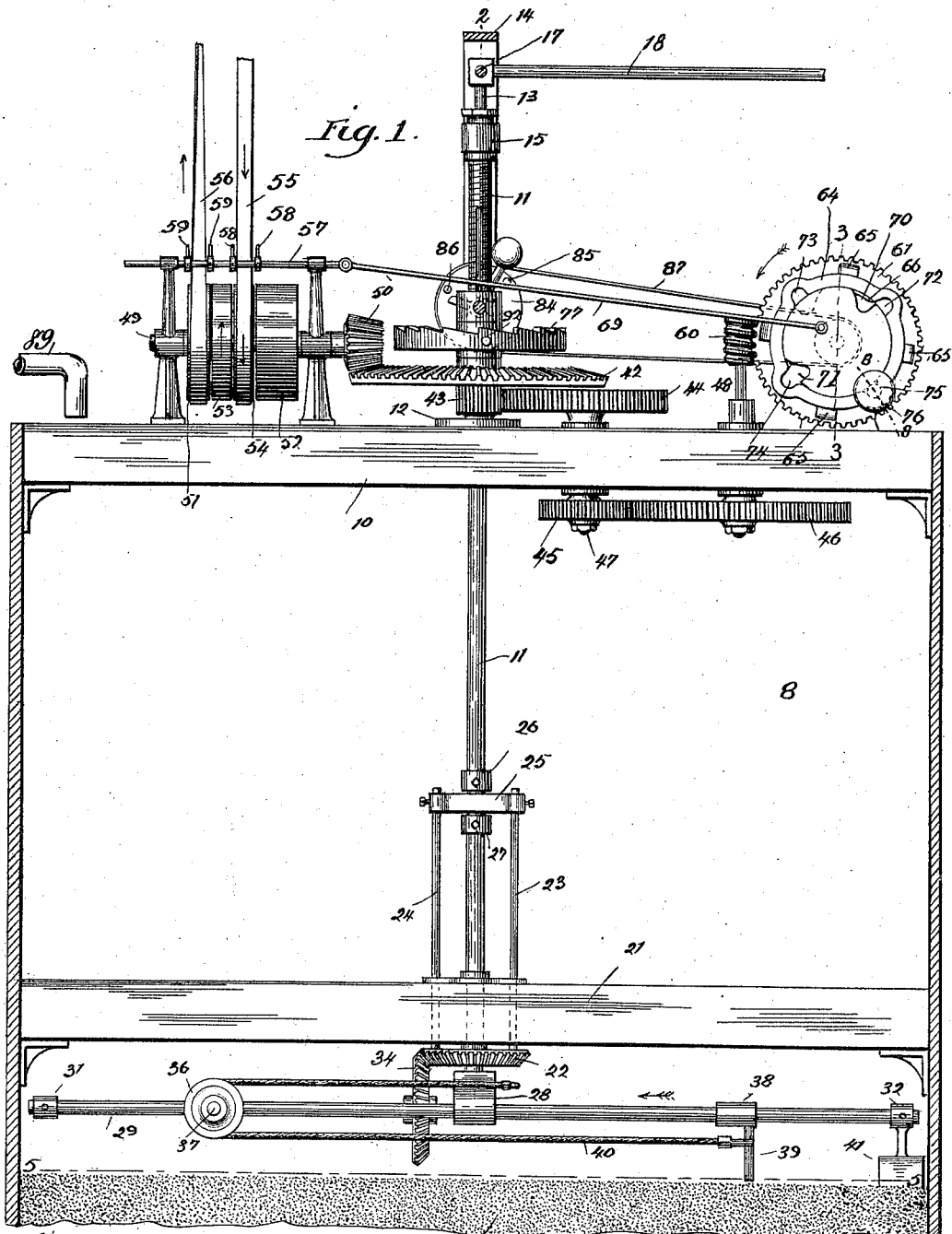
Figure 5:
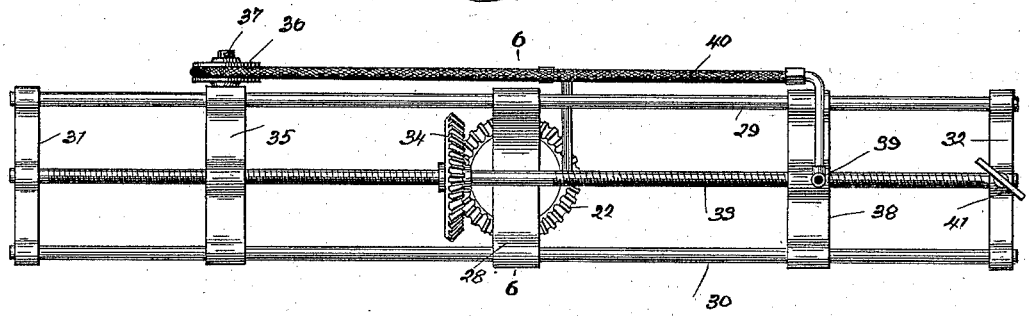
Figure 6:
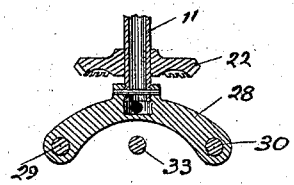
Figure 7:
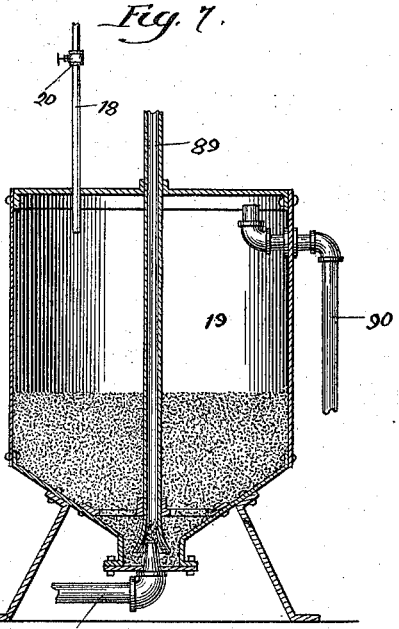

Figure 1 is a central vertical section through a filter-tank. Fig. 2 is an enlarged detail, being a partial vertical section on line 2 2 of Fig. 1. Fig. 3 is an enlarged detail, being a vertical cross-section on line 3 3 of Fig. 1. Fig. 4 is an enlarged detail, being a section on line 4 4 of Fig. 2, looking to the right. Fig. 5 is a detail, being a view on line 5 5 of Fig. 1, looking up. Fig. 6 is a vertical section on line 6 6 of Fig. 5. Fig. 7 is a central vertical section through the reservoir for washing the filtering material. Fig. 8 is a detail sectional view on the line 8 8 of Fig. 1.

My invention relates to filters, and particularly to that class of filters in which the water is filtered through a bed of sand or quartz. In filters of this class the impurities which are removed from the water are caught in the quartz-bed and accumulate there, necessitating the frequent washing of the quartz-bed in order that the water may be properly filtered as it passes through it.

It has heretofore been customary to wash the quartz without removing it from the filter-tank by agitating it and reversing the flow of water to carry off the impurities, by reversing the flow of water without violent agitation, and in various other ways. In filters of this class the greater proportion of impurities are collected in the upper layers or near the upper surface of the quartz-bed and do not extend very deep into the bed until after the filter has been used a considerable length of time without washing.

One of the objects of my invention is to provide a new and improved apparatus for purifying the filter-bed which will obviate the necessity of the use of agitators and of frequent washings by reversing the flow of the water. I accomplish this object by novel means for removing the upper surface or layer of the quartz-bed and thereby removing the greater part of the impurities and leaving the remainder of the quartz-bed substantially pure. The removal of the upper surface of the quartz-bed is continued for a greater or less period, depending on the depth of the bed and the condition of the water, and the filter-bed is thereby kept approximately pure for a great length of time without washing.

That which I regard as new will be pointed out in the claims.

In the drawings, 8 indicates a filter-tank, in which is a bed of quartz or other similar filtering material 9, as shown in Fig. 1. The tank 8 is provided with suitable pipes for conducting unfiltered water into it and with strainers and offtake-pipes for carrying away the filtered water. It is also provided with the usual wash-out pipes and valves for reversing the flow of water through the filter for washing the quartz, as will be hereinafter described. As these are common features and may be of any approved construction, and are not connected with my present invention, I will not describe their construction particularly.

10 indicates a suitable cross bar or beam which extends over the upper part of the filter and is adapted to support the various parts of the mechanism for operating the filter.

11 indicates a tubular shaft which is mounted in suitable bearings 12, supported by the cross-bar 10, and extends vertically into the tank 8 at the center of the tank, as indicated in Fig. 1. The upper portion of the shaft 11 is screw-threaded, as shown in Fig. 2.

13 indicates a pipe which is vertically mounted in a suitable frame 14 and communicates at its lower end with the tubular shaft 11, as best shown in Fig. 2, a stuffing-box 15 being provided to form a tight connection between the pipe 13 and the shaft 11, as shown. The frame 14 is provided with a slot 16 at each side in which are fitted arms 17, carried by the upper end of the pipe 13, as best shown in Fig. 2, which construction permits of the movement of the pipe 13 in a vertical direction, but prevents it from rotating. The frame 14, which supports the pipe 13, is supported by the beam 10 or in any other suitable manner.

18 indicates a pipe which connects with the upper end of the pipe 13 and terminates in a reservoir 19, located at some point below the level of the quartz-bed 9 of the filter. The pipe 18 is provided with a valve 20 at any convenient point between the pipe 13 and reservoir 19. The arrangement is such that sand and water may be siphoned from the tank 8 into the reservoir 19. The lower end of the tubular shaft 11 is fitted in suitable bearings in a beam 21, which extends transversely of the tank 8, as best shown in Fig. 1, or is supported from any other suitable support, as I do not wish to limit myself to any particular means of bracing the shaft 11.

22 indicates a bevel-gear which is mounted loosely upon the lower end of the shaft 11 and is supported by rods 23 and 24, which extend upward and are connected by a crossbar 25, which is loosely mounted upon the shaft 11, as best shown in Fig. 1. Collars 26 and 27 hold the cross-bar 25 in place on the shaft and cause the gear-wheel 22 to move vertically with the shaft. The rods 23 and 24 are prevented from rotating by being secured to the beam 21 or other support for the shaft 11. They may, however, be secured in any other suitable manner.

Mounted upon the lower end of the shaft 11 and rigidly connected thereto is a bracket 28, which is arched, as shown in Fig. 6. In the opposite ends of the bracket 28 are mounted two parallel rods 29 and 30, which are of such length that they will extend across the filter-tank, as best shown in Fig. 1. The rods 29 and 30 are connected at their ends by crossbars 31 and 32, as shown in Fig. 1.

33 indicates a screw-threaded shaft which is supported between the rods 29 and 30, the ends of the shaft 33 being supported by the cross-bars 31 and 32, as best shown in Fig. 5. One half of the shaft 33 is provided with screw-threads which are twice as fine as those on the other half of the shaft, as indicated in Fig. 5, the finer threads being on the left-hand side of the shaft, as shown.

34 indicates a gear-wheel which is mounted upon and keyed to the shaft 33 in such position that it will intermesh with the gear 22, as best shown in Fig. 1. By this construction when the shaft 11 is rotated, as will be hereinafter described, the gear 34 will be moved around the fixed or stationary gear 22 and will thereby be caused to rotate, rotating the shaft 33.

35 indicates a bracket the ends of which are mounted upon the rods 29 and 30, as best shown in Fig. 5. The bracket 35 is screw-threaded to receive the threads of one portion of the shaft 33, the arrangement being such that by rotating the shaft 33 the bracket 35 will be moved longitudinally of the shaft. The bracket 35 is mounted upon that portion of the shaft 33 which is finely screw-threaded.

36 indicates a pulley which is journaled upon a suitable pin 37, which projects from one end of the bracket 35, as best shown in Fig. 5.

38 indicates a bracket which is in all respects similar to the bracket 35, except that it is adapted to fit upon the screw-threads of the other portion of the shaft 33, as shown in Fig. 5. By this arrangement when the shaft 33 is rotated the bracket 38 will move longitudinally of the said shaft at twice the speed that the bracket 35 moves, the object of which arrangement will be hereinafter set forth.

39 indicates a tube which is rigidly connected to the bracket 38 and projects downward therefrom, as shown in Fig. 1, which tube is preferably made of metal.

40 indicates a flexible pipe which is connected at one end to the tube 39 and at the other end communicates with the interior of the tubular shaft 11, as best shown in Figs. 1 and 6. The pipe 40 is about the length of the shaft 33 and passes around the pulley 36, as shown in Figs. 1 and 5. By this arrangement as the brackets 35 and 38 move upon the shaft 33 the pipe 40 will always be held taut, for the reason that as the pipe is doubled around the pulley 36 moving the bracket 35 a certain distance either toward or away from the shaft 11 will either give out or take up a length of the pipe 40 equal to twice the distance traveled by the bracket 35. At the same time the pitch of the screw-threads in which the bracket 38 operates being twice that of the other part of the shaft 33 the bracket 38 will be caused to move twice as far as the bracket 35, thereby taking up the slack of the pipe 40. By rotating the shaft 11 in one direction the bracket 38 will be moved away from said shaft, carrying the tube 39 toward the adjacent end of the shaft 33, while the reverse movement of the shaft 11 will cause the tube 39 to move toward said shaft. The object of this arrangement will be set forth hereinafter.

41 indicates a scraper which is connected to the cross-bar 32 and projects downward therefrom, lying at an angle thereto, as best shown in Figs. 1 and 5. The scraper 41 is adapted to scrape the quartz from around the edge of the tank.

42 indicates a bevel-gear which is mounted upon the shaft 11 above the bearing 12, as best shown in Fig. 2. The gear 42 is mounted upon a feather to permit of the shaft 11 being moved vertically without affecting the position of said gear.

43 indicates a cogged pinion which is mounted upon the shaft 11, preferably below the gear 42, as best shown in Fig. 2. I prefer to form the pinion 43 integral with the gear 42, but it may be formed separate from it, if desired. The pinion 43, when formed separate from the gear 42, is also mounted upon a feather.

44, 45, and 46 indicate gears which are mounted upon suitable shafts 47 and 48, as best shown in Fig. 1, the size of the gears being such as to suitably diminish the rate of rotation of the shaft 48.

49 indicates a shaft which is mounted in suitable bearings at right angles to the shaft 11, as best shown in Fig. 1.

50 indicates a bevel-pinion mounted upon the shaft 49 in such position as to intermesh with the gear-wheel 42, as best shown in Fig. 1.

51 and 52 indicate pulleys which are loosely mounted upon the shaft 49, as best shown in Fig. 1.

53 and 54 indicate fixed pulleys which are mounted upon the shaft 49, between the loose pulleys 51 and 52.

55 indicates a belt which is adapted to fit upon the pulleys 52 and 54, as best shown in Fig. 1, which belt moves in the direction indicated by the arrow in Fig. 1.

56 indicates a twisted belt which is adapted to operate the pulleys 51 and 53. The belt 56 moves in the direction indicated by the arrow in Fig. 1.

57 indicates a shifting-rod which is mounted in suitable bearings over the pulleys 51, 52, 53, and 54, which rod is provided with arms 58 and 59, as shown in Fig. 1. The arms 58 extend on each side of the belt 55 and the arms 59 on each side of the belt 56 in the usual manner, so that by moving the rod 57 the belts 55 and 56 may be shifted. The arrangement is such that when one of the belts is operating a fixed pulley the other belt will operate a loose pulley. By this arrangement by shifting the belts 55 and 56 the shaft 49 may be rotated in either direction, thereby correspondingly rotating the gear-wheel 42 and shaft 11.

60 indicates a worm which is mounted upon the upper end of the shaft 48, as best shown in Fig. 1.

61 indicates a worm-wheel which is mounted upon a shaft 62, mounted in suitable bearings 63, which worm-wheel is engaged by the worm 60, as shown in Fig. 1.

64 indicates a ring which is secured at one side of the worm-wheel 61 by means of straps 65, as best shown in Figs. 1 and 3. The ring 64 is preferably provided with a tongue 66 around its inner surface, as shown in Fig. 3.

67 indicates a disk which fits inside the ring 64, as best shown in Fig. 3, the disk being provided with a groove adapted to receive the tongue 66, as shown. The disk 67 is loosely mounted upon one end of the shaft 62, as shown, in order to prevent it from becoming displaced and to make its motion more steady, as it freely revolves in the ring 64, the tongue and groove, aided by the shaft, serving to guide the disk in its rotation.

68 indicates a wrist-pin mounted upon the disk 67, as best shown in Figs. 1 and 3. The wrist-pin is connected by a connecting-rod 69 to the shifting-rod 57, as shown in Fig. 1, whereby by the partial rotation of the disk 67 the shifting-rod 57 may be operated.

70 and 71 indicate two recesses formed in the periphery of the disk 67, at opposite sides thereof, as shown in Fig. 1.

72, 73, 74, and 75 indicate recesses formed on the inner surface of the ring 64 at equal distances from each other, as shown in Fig. 1.

76 indicates a weight which is preferably something of the shape of an ordinary dumb-bell, the connection between the two balls being of such length that the balls will lie at opposite sides of the disk 67 and ring 64, as shown in Fig. 3. The connection between the two balls is also of such size as to fit into the recesses in the ring 64 and in the disk 67, for purposes which will be hereinafter set forth.

77 indicates a screw-threaded ratchet-wheel which is adapted to screw upon the upper end of the shaft 11, as best shown in Fig. 2, the ratchet-teeth being on the upper surface of said wheel.

78 indicates a pawl which is mounted upon a sleeve 79, which sleeve is loosely mounted upon a cross-bar 80, as best shown in Fig. 2, the length of the pawl being such that it will be adapted to engage the teeth of the ratchet-wheel 77. The cross-bar 80 is supported in a horizontal position by the frame 14, its inner end being secured to a collar 81, loosely mounted upon the shaft 11, as shown in Fig. 2.

82 indicates a bar which is substantially similar to the bar 80 and is also supported by the frame 14 and the collar 81.

83 indicates an arm which is carried by the sleeve 79 and projects therefrom about at right angles to the pawl 78, as best shown in Fig. 4. The outer end of the arm 83 is enlarged, and the arm is preferably formed of metal, so that the weight of the arm 83 will be sufficient to throw the pawl 78 into engagement with the ratchet-wheel when the arm 83 is tilted out of a vertical position.

84 indicates a pulley which is mounted upon the bar 80 near the sleeve 79, as best shown in Fig. 2.

85 and 86 indicate pins which project laterally from the pulley 84 and are of such length as to engage the arm 83, as shown in Fig. 2.

The pulley 84 is rotated by means of a belt 87, which passes around a pulley 88, mounted upon the shaft 62, as shown in Fig. 3.

The object of the pulleys and pawl will be hereinafter more fully set forth.

89, Fig. 7, indicates a pipe which extends from the lower portion of the interior of the reservoir 19 and terminates over the edge of the tank 8, as in Fig. 1. The lower end of the pipe 89 is flared, as shown in Fig. 7.

90 indicates a pipe which opens into the reservoir 19, near the top thereof, and extends to the outside of said reservoir, terminating on a level with the lower portion of the reservoir.

91 indicates a jet-pipe which opens into the flared lower end of the pipe 89 and is adapted to conduct steam thereinto. The arrangement is such that a jet of steam may be blown through the pipe 91 into the pipe 89, thereby carrying the contents of the reservoir 19 into the filter-tank 8 in the manner of an ordinary steam-jet or sand-pump.

The operation of my improved apparatus is as follows: When the belts 55 and 56 are placed as shown in Fig. 1 and they are rotated as indicated by the arrows, the bevel-gear 42 will be rotated in the direction indicated by the arrow in Fig. 1, thereby rotating the shaft 11 in the same direction. The shaft 33 will thereby be rotated in such a direction as to cause the brackets 35 and 38 to move in the direction indicated by the arrow in Fig. 1, thereby causing the tube 39 to move toward the center of the tank. As the tube 39 moves over the surface of the filtering material the upper layer of quartz will pass upward through the tube 39 and pipe 40 into the shaft 11 and thence upward through the shaft to the pipe 18. It will be necessary to start the operation of siphoning by means of a pump or other suitable device, but after it is once started the flow will be continuous. The flow may be stopped by closing the valve 20, and it may be started again by simply opening the valve 20, as such valve will prevent the admission of air to the pipe 18. When the shaft 11 is rotating, as above described, the pawl 78 will be out of engagement with the ratchet-wheel 77, as shown in Figs. 1 and 4, and the shaft 11 will not move vertically, the tube 39 moving across the surface of the quartz-bed in the same plane. The relative sizes of the pulleys 84 and 88 and the rate of rotation of the pulley 88 are so regulated with relation to the speed of motion of the tube 39 that when said tube has almost reached the center of the filter as it moves toward the center the pawl 78 will be thrown downward into engagement with the teeth of the ratchet-wheel 77, thereby holding the ratchet-wheel in a stationary position. The rotation of the shaft 11 will thereby cause it to move downward, as the screw-threads of the shaft and ratchet-wheel are so arranged as to produce such a result. This will throw the tube 39 downward into the quartz-bed for a greater or less distance, depending upon the adjustment of the various parts of the apparatus. Any desired downward movement may be secured by properly adjusting the different parts of the mechanism. When the gear-wheel 42 rotates in the direction indicated by the arrow in Fig. 1, the worm 60 will be operated in such a direction as to rotate the worm-wheel 61 in the direction indicated by the arrow in Fig. 1. At this time the weight 76 will rest in the recess 75 of the ring 64, as shown in Fig. 1, and as the wheel 61 rotates the weight will be carried upward around the disk 67. When the tube 39 reaches the center of the tank, the weight 76 will have arrived at a point opposite the recess 70 in the disk 67, the parts being so adjusted as to produce this result. The weight 76 will thereby fall into the recess 70, when its weight will cause it to swing the disk 67 downward a quarter of a revolution, thereby throwing the wrist-pin 68 on the other side of the pivot of the disk and shifting the shifting-rod 57 to throw the belts 55 and 56 onto the pulleys 52 and 53, respectively. The direction of rotation of the shaft 49 will thereby be reversed, reversing the direction of rotation of the gear 42, shaft 11, and shaft 33. The direction of rotation of the worm 60 will also be reversed, reversing the rotation of the worm-wheel 61 and pulley 88. The pulley 84 will also be reversed and the pawl 78 will be lifted from the ratchet-wheel 77. The pawl 78 will not now prevent the rotation of the ratchet 77 with the shaft 11, for the reason that it will merely click over the teeth of the ratchet-wheel. When the arm 83 passes a vertical line, it will rest on the pin 85 and will remain there until thrown into engagement with the ratchet-teeth just prior to the time when the tube 39 again reaches the center of the filter-tank. By the reversal of the rotation of the shaft 33 the brackets 35 and 38 will move in the opposite direction from that above described, thereby moving the tube 39 away from the center of the tank. As the tube 39 moves constantly away from the center or toward the center, while the shaft 33 is rotated about the center of the tank, it will traverse a spiral path over the surface of the filtering material, in one case moving away from the center and in the other case toward the center of the tank in a horizontal plane. By this means the surface of the quartz-bed is lowered uniformly and the greater proportion of the impurities removed. As the tube 39 is moving outward from the center of the tank the ring 64 will be rotated in a direction opposite to that indicated by the arrow in Fig. 1, carrying with it the weight 76, which will have been deposited in the recess 74 when it moved downward in the recess 70 of the disk 67, as above described. The recess 71 in the disk 67 will have been moved a quarter-rotation upward by the partial rotation of the disk 67, as above described, and will lie opposite the point at which is shown the recess 73 of the ring 64 in Fig. 1, as indicated by dotted lines in Fig. 1. When the tube 39 reaches the outer end of the shaft 33, the ring 64 will have made half a revolution, thereby carrying the weight 76 to a point opposite the recess 71. The weight will therefore drop into its recess and will move the disk 67 a quarter of a turn in the direction opposite to that in which it was first rotated, thereby again shifting the rod 57, throwing the belts 55 and 56 back to the position shown in Fig. 1 and reversing the direction of rotation of the shaft 11, and consequently causing the tube 39 to move toward the center of the tank. When the tube 39 has again nearly reached the center of the tank, the pawl 78 will again be thrown into engagement with the ratchet-teeth 77, and the shaft 11 will be again lowered a small amount, and the operations will continue as above described. By this construction the tube 39 will be continuously moved over the surface of the tank in one direction or the other, each time skimming off the surface of the filter-bed and carrying off the impurities which have been collected there. When as much of the quartz-bed has been removed as it is desired to remove, the shaft 11 is moved upward to the position shown in Fig. 1. In order to move the shaft 11 upward, a pin 92 is provided which projects from the periphery of the ratchet-wheel 77, as best shown in Fig. 2. By moving a bar 93 or other suitable instrument in contact with the pin 92 the ratchet-wheel 77 may be held stationary, while the shaft 11 is rotated in such direction as to cause it to move upward in the screw-threaded ratchet-wheel. I do not wish to limit myself, however, to this specific means of holding the ratchet-wheel stationary to raise the shaft 11, although it is the one which I prefer.

As above described, the quartz which is removed from the filter-tank is carried into the reservoir 19, and is afterward returned to the tank 8 by means of the jet-pump 91. After the quartz has been returned to the tank 8 the current of water through the filter is reversed in the usual manner and all the quartz in the tank thoroughly washed, when the operations above described are repeated.

The particular advantage of my improved apparatus for purifying the filter-bed is that the filter requires very little attention, and as the operation of purifying the bed is continuous during filtering the supply of water is not affected. It is not necessary that the entire filter should be washed, as above described, very frequently, as the removal of the impure portions of quartz prevents the impurities from working down into the bed, and it is only necessary to wash the bed when the quantity of quartz removed reduces the quantity in the tank below the amount necessary for proper filtration.

I do not wish to limit myself to the use of any particular means for returning the quartz to the filter-tank, as any suitable means may be provided.

In filtering waters in which the impurities are flocculent or in which they would have a tendency to accumulate upon the surface of the filter-bed it would not be necessary to remove anything but the impurities, leaving the filter-bed intact. The manner of removing such impurities would be the same as that described for removing the filter-bed. In most instances, however, a greater or less proportion of the impurities works down into the filter-bed, necessitating the removal of the material composing it.

Prior to my invention it has been proposed to clean or purify a filter-bed by removing by suction the slimy or sedimentary matter only accumulating at or near the surface of the bed, and for this purpose a series of pendent pipes has been arranged to extend below the surface of the filter-bed and caused to travel in a circular path through the medium of a vertical rotary shaft. In this operation the filter-bed is stirred up or agitated, which agitation is a serious objection, in that a large quantity of sediment is permitted to pass through into the filtered-water pipes, and, furthermore, by the use of any prior invention it is impossible to remove a part of the filtering quartz or sand with the sediment to accomplish the removal of all the sediment. In my invention the sand and sediment are removed from above, and the filter-bed is not agitated in any manner, and, further, it is practicable to remove all the sediment by removing a portion of the filtering material, so that the filter may be purified without interrupting filtration as well as without agitating the filter-bed.

That which I claim as my invention, and desire to secure by Letters Patent, is—

1. In a filter, the combination with a tank, and filtering material located therein, of a conducting-tube movable over the surface of the filtering material toward and away from the center of the tank, and operating mechanism for moving said tube alternately toward and away from the center of the tank, substantially as described.

2. In a filter, the combination with a tank, and a filter-bed, of a device for conducting the impurities to the exterior of the tank, and means operating from above the surface of the filter-bed and out of contact therewith for sucking up from the entire surface of the filter-bed the impurities at the top of the filter-bed without penetrating it or agitating it, substantially as described.

3. In a filter, the combination with a tank, and a filter-bed, of a tube for conducting the impurities to the exterior of the tank, means for moving said tube to cover the entire surface of the filter-bed in close proximity thereto but without penetrating the bed, said tube having an opening in its under side opposite to the filter-bed, and means for causing the impurities to rise vertically into said tube without requiring it to penetrate the bed, whereby they may be removed without agitating the filter-bed, substantially as described.

4. In a filter, the combination with a tank, and a filter-bed located therein, of a conducting-tube adapted to be moved over the surface of the filter-bed, said tube being in communication with the exterior of the tank and having an opening in its under side opposite to the filter-bed, mechanism for moving the said tube to cover the entire surface of the filter-bed in close proximity thereto but not in contact therewith, and means for sucking up the impurities vertically into said tube without causing the latter to penetrate the bed, for purifying the filter without agitating the filter-bed, substantially as described.

5. In a filter, the combination with a tank, and a tubular shaft, of a tube carried thereby and communicating therewith, and operating mechanism for moving said tube in a spiral path over the surface of the filtering material, substantially as and for the purpose specified.

6. The combination with a filter-tank, a vertically-movable tubular shaft mounted therein, mechanism for moving said shaft vertically, and mechanism for rotating said shaft, of a tube carried by said shaft and communicating therewith, and operating mechanism driven by the rotation of said shaft to cause said tube to move in a spiral path over the surface of the filtering material, substantially as and for the purpose specified.

7. The combination with a filter-tank, a vertically-movable tubular shaft mounted therein, mechanism for moving said shaft vertically, and mechanism for rotating said shaft, of a screw-threaded rod journaled at the lower end of said shaft in a horizontal position, mechanism for rotating said rod, a bracket mounted upon said rod, a tube depending from said bracket and communicating with said shaft, and devices for preventing said bracket from rotating, whereby when said rod is rotated the bracket and tube will be moved longitudinally thereupon, substantially as and for the purpose specified.

8. The combination with a filter-tank, a vertically-movable tubular shaft mounted therein, mechanism for moving said shaft vertically, and mechanism for rotating said shaft, of a fixed gear-wheel mounted at the lower end of said shaft, a screw-threaded rod supported by said shaft in a horizontal position, a gear-wheel mounted upon said rod and intermeshing with said fixed gear-wheel, and a tube mounted upon said rod and movable on the screw-threads thereof, said tube being in communication with said shaft, substantially as and for the purpose specified.

9. The combination with a filter-tank, a vertically-movable tubular shaft mounted therein, mechanism for moving said shaft vertically, and mechanism for rotating said shaft, of a screw-threaded rod journaled at the lower end of said shaft in a horizontal position, mechanism for rotating said rod, a bracket mounted upon said rod, a tube depending from said bracket, a flexible pipe connecting said tube and the shaft, means for holding said flexible pipe taut, and devices for preventing said bracket from rotating, whereby when said rod is rotated the bracket and tube will be moved longitudinally thereupon, substantially as and for the purpose specified.

10. The combination with a filter-tank, a vertically-movable tubular shaft mounted therein, mechanism for moving said shaft vertically, and mechanism for rotating said shaft, of a screw-threaded rod journaled at the lower end of said shaft and extending across the tank in a horizontal position, the threads on one half of said rod being twice as fine as those on the other half thereof, mechanism for rotating said rod, two brackets mounted upon said rod at opposite sides of the center thereof, a pulley carried by the bracket which is mounted upon the finer screw-threads of the rod, a tube depending from the other of said brackets, and a flexible pipe connecting said tube with said shaft, said pipe passing around said pulley, substantially as and for the purpose specified.

11. The combination with a filter-tank, a vertically-movable tubular shaft 11 mounted therein, mechanism for moving said shaft vertically, and mechanism for rotating said shaft, of rods 29 and 30 supported by said shaft, a screw-threaded shaft 33 supported by said rods, brackets 35 and 38 moving on said shaft 33, pulley 36 on said bracket 35, tube 39 depending from said bracket 38, and a flexible pipe 40 connecting said tube 39 and the shaft 11, gear 34 mounted on said shaft 33, and a fixed gear 22 adapted to intermesh with said gear 34, substantially as and for the purpose specified.

12. The combination with a filter-tank, a vertically-movable screw-threaded tubular shaft mounted therein, and mechanism for rotating said shaft in one direction, of a tube carried by said shaft and communicating therewith, devices operated by the rotation of the vertically-movable shaft for moving the tube to cover the entire surface of the filtering material, and reversing mechanism for automatically reversing the rotation of the tubular shaft to reverse the motion of said tube, substantially as and for the purpose specified.

13. The combination with a filter-tank, a vertically-movable screw-threaded tubular shaft mounted therein, a bearing for said shaft, and a gear-wheel mounted thereupon, of a horizontal shaft geared to said gear-wheel, fixed and loose pulleys mounted upon said horizontal shaft, belts for rotating said pulleys, devices operated by the rotation of the vertically-movable shaft for shifting said belts to reverse the rotation of the tubular shaft, a tube 39 carried by the tubular shaft and communicating therewith, and means for causing the tube to cover the entire surface of the filtering material, substantially as and for the purpose specified.

14. The combination with a filter-tank, a vertically-movable screw-threaded tubular shaft mounted thereupon, and means for rotating the tubular shaft, of a tube having communication with the vertically-movable tubular shaft and adapted to travel horizontally over the surface of the filtering material for removing by suction the entire upper surface or layer of the impurities accumulated upon the filter-bed, operating mechanism for moving said tube in a horizontal plane over the surface of the filtering material, a wheel fitted on the screw-threads of the vertically-movable tubular shaft, and devices for holding the wheel stationary for causing the tubular shaft to move vertically, substantially as described.

15. In a filter, the combination with a tank, a tubular screw-threaded shaft vertically mounted therein, a tube communicating with said shaft, mechanism for moving said tube over the surface of the filtering material, and mechanism for rotating said shaft, of a wheel mounted upon the screw-threads of said shaft, and operating mechanism actuated by the rotation of said shaft for holding said wheel in a stationary position to effect the downward movement of said shaft at stated intervals, substantially as and for the purpose specified.

16. The combination with a filter-tank, a tubular screw-threaded shaft vertically mounted therein, means for rotating said shaft, a tube communicating with said shaft, and mechanism for moving said tube over the surface of the filtering material, of a ratchet-wheel mounted upon the screw-threads of said shaft, a pawl adapted to engage the teeth of said ratchet-wheel, and mechanism for automatically throwing said pawl into engagement with said ratchet-wheel to effect the downward movement of said shaft at stated intervals, substantially as and for the purpose specified.

17. The combination with a filter-tank, a tubular screw-threaded shaft vertically mounted therein, means for rotating said shaft, a tube communicating with said shaft, and mechanism for moving said tube over the surface of the filtering material, of a ratchet-wheel 77 mounted upon said shaft, pawl 78 adapted to engage the teeth of said ratchet-wheel, pulley 84, pins 85 and 86 for operating said pawl, and means for rotating said pulley 84 to throw said pawl into engagement and out of engagement with said ratchet-wheel at stated intervals, to effect the downward movement of said shaft, substantially as described.

18. The combination with a filter-tank, a tubular screw-threaded shaft vertically mounted therein, gear-wheel 42 mounted on a feather on said shaft, shaft 49, pinion 50 mounted on said shaft and intermeshing with said gear-wheel 42, fast pulleys 53 and 54 and loose pulleys 51 and 52 mounted on said shaft, belts 55 and 56, shifting-rod 57 for shifting said belts, a tube 39 communicating with said tubular shaft, and mechanism for moving said tube over the surface of the filter-bed, of a worm-gear 61, a worm 60 for operating said worm-gear, said worm being geared to said tubular shaft, whereby by the rotation of said shaft the worm will be operated, ring 64 carried by said worm-gear, said ring having recesses in its inner surface, disk 67 mounted in said ring, said disk having recesses 70 and 71, a weight adapted to fit into the recesses in said disk and ring, and a connecting-rod 69 connecting said disk and the shifting-rod 57, substantially as and for the purpose specified.

19. The combination with a filter-tank, a tubular screw-threaded shaft vertically mounted therein, gear-wheel 42 mounted on a feather on said shaft, shaft 49, pinion 50 mounted on said shaft and intermeshing with said gear-wheel 42, fast pulleys 53 and 54 and loose pulleys 51 and 52 mounted on said shaft, belts 55 and 56, shifting-rod 57 for shifting said belts, a tube 39 communicating with said tubular shaft, and mechanism for moving said tube over the surface of the filter-bed, of a worm-gear 61, a worm 60 for operating said worm-gear, said worm being geared to said tubular shaft, whereby by the rotation of said shaft the worm will be operated, ring 64 carried by said worm-gear, said ring having recesses in its inner surface, disk 67 mounted in said ring, said disk having recesses 70 and 71, a weight adapted to fit into the recesses in said disk and ring, a connecting-rod 69 connecting said disk and the shifting-rod 57, ratchet-wheel 77 mounted on said tubular shaft, pawl 78, pulley 84, pins 85 and 86 carried by said pulley, arm 83, pulley 88 mounted on the same shaft with the worm-gear 61, and a belt 87, substantially as and for the purpose specified.

WILLIAM M. JEWELL.

Witnesses:
   A. H. ADAMS,
   C. E. PICKARD.